(12) United States Patent
Birk et al.

(10) Patent No.: US 11,215,503 B2
(45) Date of Patent: Jan. 4, 2022

(54) METHOD FOR COUNTING PHOTONS BY MEANS OF A PHOTOMULTIPLIER

(71) Applicant: Leica Microsystems CMS GmbH, Wetzlar (DE)

(72) Inventors: Holger Birk, Meckesheim (DE); Bernd Widzgowski, Dossenheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 3 days.

(21) Appl. No.: 16/641,674

(22) PCT Filed: Aug. 28, 2018

(86) PCT No.: PCT/EP2018/073093
§ 371 (c)(1),
(2) Date: Feb. 25, 2020

(87) PCT Pub. No.: WO2019/042973
PCT Pub. Date: Mar. 7, 2019

(65) Prior Publication Data
US 2020/0386616 A1 Dec. 10, 2020

(30) Foreign Application Priority Data
Aug. 28, 2017 (DE) ...................... 10 2017 119 663.3

(51) Int. Cl.
*G01J 1/44* (2006.01)
*G02B 21/00* (2006.01)

(52) U.S. Cl.
CPC ............ *G01J 1/44* (2013.01); *G02B 21/0096* (2013.01); *G01J 2001/442* (2013.01); *G01J 2001/444* (2013.01); *G01J 2001/4446* (2013.01)

(58) Field of Classification Search
CPC .. G01J 1/44; G01J 2001/442; G01J 2001/444; G01J 2001/4446; G02B 21/0096
See application file for complete search history.

(56) References Cited

U.S. PATENT DOCUMENTS 4,744,667 A * 5/1988 Fay ..................... G02B 21/0096
250/461.1
5,892,222 A * 4/1999 Elabd ................ H01L 27/14667
250/226

(Continued)

FOREIGN PATENT DOCUMENTS

DE 112011102595 T5 5/2013

OTHER PUBLICATIONS

Moon, Sucbei et al. "Analog single-photon counter for high-speed scanning microscopy," Optics Express, Sep. 1, 2008, pp. 13990-17105, XP055528324.

(Continued)

*Primary Examiner* — Seung C Sohn
(74) *Attorney, Agent, or Firm* — Leydig, Voit & Mayer, Ltd.

(57) ABSTRACT

A method for counting photons using a photomultiplier includes obtaining a measurement signal from a raw signal produced by the photomultiplier by correcting the raw signal for a noise signal and/or an offset, wherein an incident photon produces a pulse in the raw signal. The measurement signal is integrated over time to form an analog integrated measurement signal. A number of photons that are incident in the photomultiplier is ascertained by comparing a value of the analog integrated measurement signal to an integral proportionality value which corresponds to a specific number of photons incident in the photomultiplier.

14 Claims, 3 Drawing Sheets

(56) References Cited

U.S. PATENT DOCUMENTS

| | | | |
|---|---|---|---|
| 6,188,473 B1 | 2/2001 | Leistner et al. | |
| 6,687,000 B1 * | 2/2004 | White | G02B 21/16 |
| | | | 356/328 |
| 7,453,987 B1 * | 11/2008 | Richardson | G01V 5/0041 |
| | | | 378/57 |
| 2008/0099689 A1 | 5/2008 | Nygard et al. | |
| 2013/0099100 A1 | 4/2013 | Pavlov | |
| 2013/0114073 A1 | 5/2013 | Namba et al. | |
| 2015/0085985 A1 | 3/2015 | Funaki et al. | |

OTHER PUBLICATIONS

Becker, Wolfgang and Bergman, Axel, "Multi-dimensional time-correlated single photon counting," Advanced Photon Counting Techniques II, Proc. of SPIE vol. 6771, Oct. 11, 2007.

* cited by examiner t t t t t

METHOD FOR COUNTING PHOTONS BY MEANS OF A PHOTOMULTIPLIER

CROSS-REFERENCE TO PRIOR APPLICATIONS

This application is a U.S. National Phase application under 35 U.S.C. § 371 of International Application No. PCT/EP2018/073093, filed on Aug. 28, 2018, and claims benefit to German Patent Application No. DE 10 2017 119 663.3, filed on Aug. 28, 2017. The International Application was published in German on Mar. 7, 2019 as WO 2019/042973 under PCT Article 21(2).

FIELD

The present invention relates to a method for counting photons by means of a photomultiplier, to a computing unit and to a computer program for performing it and also to a microscope system for carrying out the method.

BACKGROUND

Light detectors having the highest possible sensitivity are used for example in confocal microscopy to capture the fluorescence light emitted by the sample with the best possible signal-to-noise ratio and quantitatively as accurately as possible. Various types of photomultipliers are suitable herefor. It is in particular desirable to use semiconductor photomultipliers (SCPM) such as silicon photomultipliers (SiPM) for this purpose, since these offer advantages in terms of sensitivity, temporal resolution and robustness at relatively small costs.

In an SCPM, an analog pulse 100 is produced from each detected photon, wherein a typical signal profile (intensity over time) is shown in FIG. 1. The pulse shape is divided into a rapid increase 101 in the ns to sub-ns range and a drop 102 in the range of typically 20-100 ns. The signal height is given substantially by the bias voltage above the avalanche breakdown and the capacitance of the individual cell, and of course by amplification factors of the subsequent electronics. The rapid increase is a consequence of the breakdown, at which the capacitance of the biased diode is discharged to below the breakdown voltage, and the slower drop is the result of the RC time constants in combination with what is known as the "quenching" resistance. The area under the signal curve corresponds, as it were, to the charge liberated during the breakdown. An SiPM having dimensions that are reasonable for confocal microscopy (e.g. 1.3 mm×1.3 mm; 200-1500 individual cells connected in parallel) offers, in addition to great homogeneity, signals of equal size or the same charge for each cell impinged upon by a photon.

In principle, the data recording in photomultipliers can be effected either in the counting mode or in the integration mode (also referred to as digital or analog mode).

One possible approach for obtaining a signal that is proportional to the number of the incident photons is to count the events by comparing the analog signal to a threshold and by increasing a counter each time the latter is exceeded. As soon as pulses superpose, however, the measured counting rate is smaller than the actual number of events. Knowing the instantaneous photon statistics and the pulse shape, it is possible to draw conclusions with respect to the error and possibly correct it. In the case of pulsed excitation, it is also necessary to know the fluorescence lifetime to perform successful correction. That is to say, the correction must be effected in dependence on the sample, which entails additional outlay.

A further possibility to keep the errors as small as possible when counting pulses is to bring the pulses into as short a form as possible. This can be accomplished either by high-pass filtering of the output signal or by way of a capacitive tap between the diode and quenching resistor, such as for example shown in US 2013/0099100 A1. However this reduces the signal height.

The methods mentioned have in common that a saturation effect occurs during counting and that for example pulses with twice the height cannot be differentiated from simple pulses.

WO 2012/017762 shows a method in which a measurement signal is subjected to threshold value processing such that only signal values that lie above the threshold value are taken into account. The area under the pulses is then ascertained to determine the number of photons therefrom. However, due to the threshold value processing, the area and number of photons are not always proportional. For this reason it is necessary to calculate both a reference value and the threshold value.

It is therefore desirable to specify an improved method for counting photons.

SUMMARY

In an embodiment, the present invention provides a method for counting photons using a photomultiplier. A measurement signal is obtained from a raw signal produced by the photomultiplier by correcting the raw signal for a noise signal and/or an offset, wherein an incident photon produces a pulse in the raw signal. The measurement signal is integrated over time to form an analog integrated measurement signal. A number of photons that are incident in the photomultiplier is ascertained by comparing a value of the analog integrated measurement signal to an integral proportionality value which corresponds to a specific number of photons incident in the photomultiplier.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
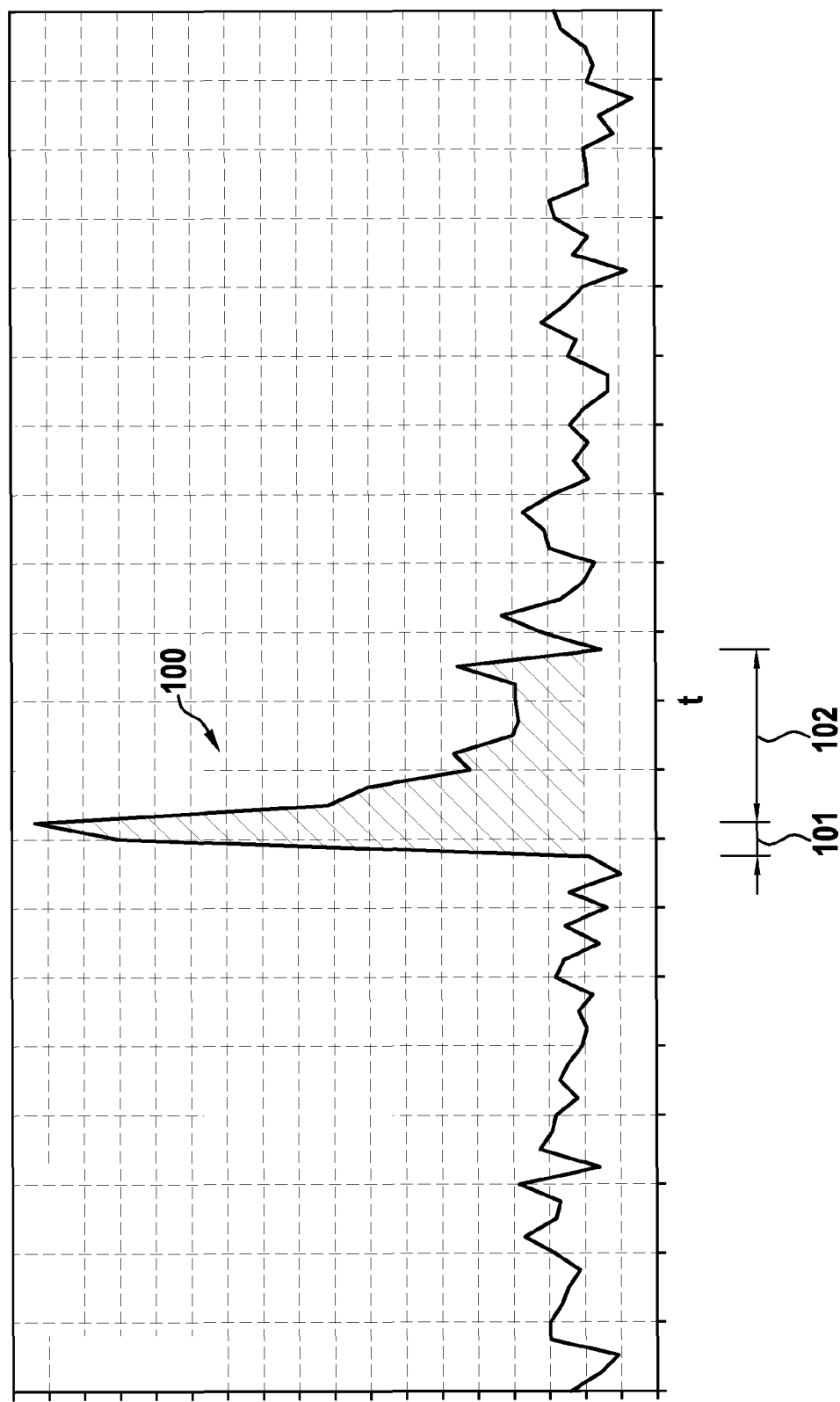
FIG. 1 shows a pulse in a raw signal of a silicon photomultiplier, which occurs upon detection of a photon.

Embodiments of the invention provide a method for counting photons by means of a photomultiplier, in particular a semiconductor or silicon photomultiplier (SiPM), and also a computing unit and a computer program for performing it, as well as a microscope system, in particular a confocal microscope system or scanning confocal microscope system.

It is possible with embodiments of the present invention to evaluate the raw signal of a photomultiplier such as in the case of counting detectors, without information being lost due to superpositions and the like, because the invention is based on an integration or sum measurement over an arbitrarily long time period. This (analog) integrated measurement signal is evaluated—in particular already during and not only after the integration or sum measurement—using an integral proportionality value corresponding to a specific number of photons that are incident in the photomultiplier in order to ascertain the number of the photons. The method according to embodiments of the invention can also advantageously be used if an excitation signal that is directed onto a sample is itself pulsed.

In a photomultiplier, every incident or detected photon corresponds to a specific charge and consequently to a specific area under the measurement signal. In knowledge of the proportionality factor which corresponds to the integral proportionality value, it is possible to directly deduce the number of the detected photons from this area, which corresponds to the value of the integrated measurement signal. This can be accomplished particularly advantageously by evaluating the measurement signal without further pulse shaping. In particular, threshold value processing is not necessary and should not be done so as not to falsify the result. The distribution of the pulses here has almost no influence on the result, because it is dependent only on the area under the pulses and not on the temporal arrangement thereof, in other words superposed or separated.

An embodiment of the invention is particularly suitable for use in confocal microscopy, because here, very precise measurements even of superposed photons are necessary. Despite the requirements in terms of the accuracy of the attainable results, it is now possible with the use of the invention to also use relatively cheap and robust photomultipliers, in particular SiPM.

A computing unit according to an embodiment of the invention, for example a control device of a microscope, in particular of a confocal microscope, is configured, in particular in terms of programming, to perform a method according to the invention.

The implementation of the method in form of a computer program is also advantageous because this incurs particularly low costs, in particular if a performing control device is also used for further tasks and is therefore already present. Suitable data carriers for providing the computer program are in particular magnetic, optical and electric memories, such as for example hard disks, flash memories, EEPROMs, DVDs and others. Downloading a program via computer networks (Internet, intranet, etc.) is also possible.

Further advantages and configurations of the invention are evident from the description and the attached drawing.

It is to be understood that the features mentioned above and the features which are yet to be explained may not merely be used in the respectively specified combination, but also in other combinations or alone, without departing from the scope of the present invention.

A process of a preferred embodiment of the invention will be described below with reference to FIGS. 2 to 6, in which in each case signal profiles over time are illustrated. Here, the signal profile of a Figure having a higher number is typically the result of the signal profile of a Figure with the next lower number by way of performing method steps of a preferred embodiment of the invention.

Figure 2:
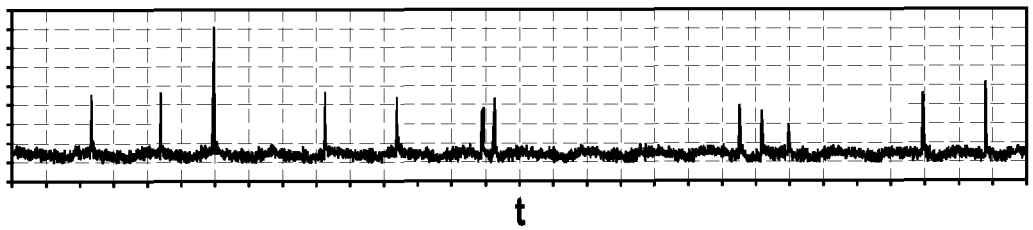
FIG. 2 shows a temporal profile of an exemplary raw signal of a silicon photomultiplier.

FIG. 2 shows a temporal profile of an exemplary raw signal, as is produced by a photomultiplier during operation, which is embodied for example as a silicon photomultiplier (SiPM). The length of the section illustrated is approximately 60 μs. An analog-to-digital converter (ADC) is connected in particular downstream of the SiPM to permit digital processing of the signals. In this case, it is of particular importance to ensure that the sampling rate of the ADC as compared to a typical inverse pulse width is high enough to ensure that the pulses are sampled reliably.

It is evident that the raw signal shows a number of pulses which correspond to the detection of photons by the SiPM. Each of said pulses substantially corresponds to a pulse 100 according to FIG. 1.

It is evident that the third pulse is approximately twice as high as the other pulses, so it can be assumed that in this case, two photons were detected almost simultaneously.

It is furthermore evident that the raw signal includes noise and offset.

In the present case, a measurement signal is initially obtained from the raw signal produced by the SiPM by correcting the raw signal produced by the SiPM for a noise signal and/or an offset. In other words, the noise signal and/or offset are subtracted from the raw signal for the purpose of correction. The measurement signal obtained in this way is a continuous signal with "noise" at around the zero point and with pulses that represent photon events (see also FIG. 3). In this context it seems advantageous to obtain the noise signal or the offset from a raw signal that was produced by the SiPM in darkness so as to capture only what is known as dark noise, if possible.

For ascertaining the ADC offset, for example, the raw signal is captured without illumination, that is to say merely with a few pulses owing to dark noise. In the case of dark noise, the occurrence of the pulses is so rare that a superposition can be all but excluded. With suitable filtering, the remaining pulses are suppressed, so that the level of the pulse-free ADC signal is obtained. Herefor, for example a median filter having an order>pulse duration is suitable.

Alternatively, the ADC values can be examined for the occurrence of a rapid increase, and in that case it is possible for n values before and m values after (n and m are appropriately chosen) not to be respectively taken into consideration during the average formation such that the profile of a complete pulse is taken out of the averaging.

Figure 3:
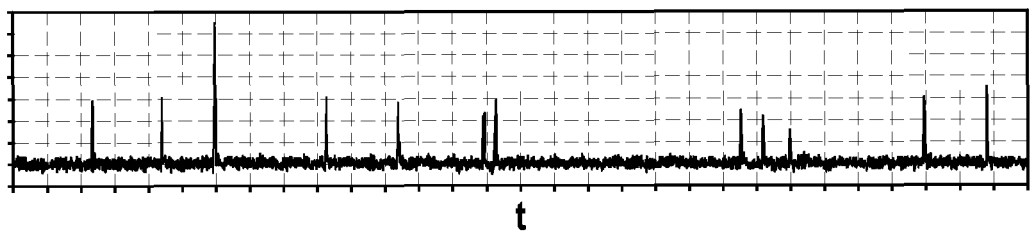
FIG. 3 shows a temporal profile of a measurement signal obtained from the raw signal from FIG. 2 after the subtraction of noise.

FIG. 3 illustrates a profile of the measurement signal, which is obtained by subtracting the offset ascertained by median filtering from the raw signal.

The measurement signal according to FIG. 3 obtained for relatively few pulses can simultaneously also be used to determine the integral proportionality value. Consequently, the measurement signal according to FIG. 3 simultaneously serves as a calibration signal.

In particular, the integral proportionality value corresponding to a specific number of photons that have been incident in the photomultiplier is determined by integrating the calibration signal over time to obtain an integrated calibration signal, and the number of the photons that have been incident in the photomultiplier during this time is determined. Advantageously, the integration period over which the calibration signal is integrated is selectable.

Using the example of FIG. 3, the pulses occurring for a pre-selectable time period are counted for example by comparison with a predetermined photon detection threshold value. At the same time, the measurement signal which has been corrected for the previously ascertained offset is integrated in the same time period or the sum of all the corrected ADC values is obtained. According to a preferred embodiment, this integral value or this sum divided by the number of the counted pulses gives the integral proportionality value, that is to say the area or ADC sum per photon. In the present example, an integral proportionality value that corresponds to a single photon incident in the SiPM is determined as the integral proportionality value that corresponds to a specific number of photons incident in the SiPM.

Figure 4:
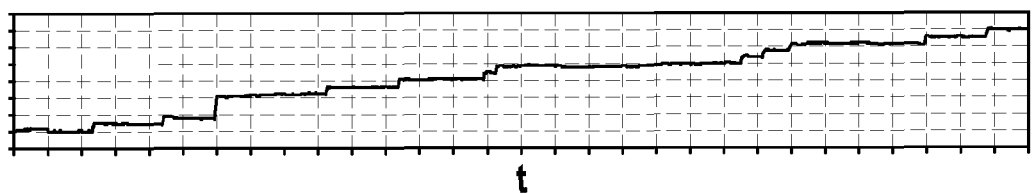
FIG. 4 shows a temporal profile of an integrated measurement signal, obtained by temporal integration of the measurement signal from FIG. 3.

For the actual evaluation, the integrated measurement signal is, according to FIG. 4, compared continuously below to the integral proportionality value, and the number of the photons is ascertained therefrom. Every time the value of the integrated measurement signal rose by the integral proportionality value, a number of photons corresponding to the integral proportionality value (in the present example exactly one photon) was detected by the SiPM.

Counting is preferably possible by way of the number (that is to say the running counting value) being increased each time by the specific number (in this case one) if the value of the integrated signal has increased by the integral proportionality value.

It should be emphasized that, in the method for counting pulses proposed here, exceeding a threshold value is used only for calibration purposes. During operation, the evaluation is performed via the integral of the signal shape.

Figure 5:
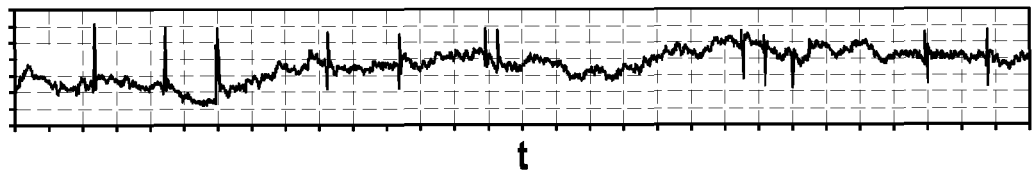
FIG. 5 shows a temporal profile of the integrated measurement signal obtained by subtracting integral proportionality values from the integrated measurement signal of FIG. 4.

To simplify the capturing, in particular for keeping the values readily available in the computing unit, the running value of the integrated measurement signal according to FIG. 4 is preferably reduced at each counting event by the integral proportionality value so as to obtain an integrated measurement signal according to FIG. 5. At the same time, the number of photons can be determined by incrementing a counting value of the number of photons every time the integral proportionality value is subtracted from the integrated measurement signal.

The method steps explained in connection with FIGS. 2 to 5 are preferably performed by a computing unit in a hardware- and/or software-implemented fashion, wherein the computing unit is embodied for example in the form of a detector which can be controlled by a superordinate computing unit and makes available to said computing unit for example the counting value and/or one or more of the signal profiles according to FIGS. 2 to 5, in particular in the form of digital value sequences.

Figure 6:
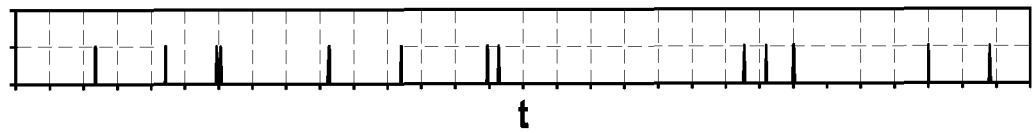
FIG. 6 shows a temporal profile of isolated pulses, as are obtained from the signals according to FIG. 4 or FIG. 5.

Optionally, it is also possible to produce and output an output signal comprising only the pulses according to FIG. 6, which can be used for example for counting in the superordinate computing unit.

In order to compensate for any occurring drift of the raw signal or fluctuations in the avalanche amplification, the steps for determining noise/offset and/or integral proportionality value during illumination pauses can be regularly repeated. Alternatively or additionally, it is possible to automatically determine on the basis of the ADC signal when the illumination is so low that a new determination of noise/offset and/or integral proportionality value can be made.

In the case of SiPMs, non-linearities in the raw signal can occur not only on the basis of pulses that were not captured. If a cell is discharged, it provides only a correspondingly smaller pulse if a second photon is incident during recharging. This effect can arise in the case of strong illumination and would manifest in the case of conventional counting by way of non-detected, smaller pulses.

In the method proposed here, in the case of a high intensity, a deviation in the relationship between the integrated measurement signal and the integral proportionality value occurs owing to a charge quantity that is lower per pulse, that is to say the increase of the integrated measurement signal for the specific number of photons is smaller than the integral proportionality value. This is because, if a cell which has discharged owing to a first photon is impinged upon by a second photon before it has completely recharged, the charge quantity that is output in the case of the second photon is lower. The probability that cells are impinged upon multiple times within their charging time is greater the more photons/time are incident on the detector. In order to maintain the relationship even in this working region, the ADC signal can be corrected before further processing, for example by calculating signal increases that correspond to a specific proportion of the integral proportionality value to obtain the latter. This can be accomplished for example via a "look-up table" (LUT) or other linearization functions.

Furthermore, the photons to be detected distribute themselves based on the type of construction of a SiPM over a surface on the detector, which consists of a plurality of cells. If the area over which the photons distribute themselves is then reduced due to apparatus-related parameters (such as the size of what are known as pinholes, as can be used in confocal microscopes), then, with the same ADC signal, the probability that cells are impinged upon multiple times within their charging time increases. The correction necessary for linearization is thus dependent on the number of cells over which the photons to be detected are distributed. Therefore, it continues to be possible to dynamically adapt the linearization function of the ADC values in dependence on said parameter (for example size of pinholes).

Figure 7:
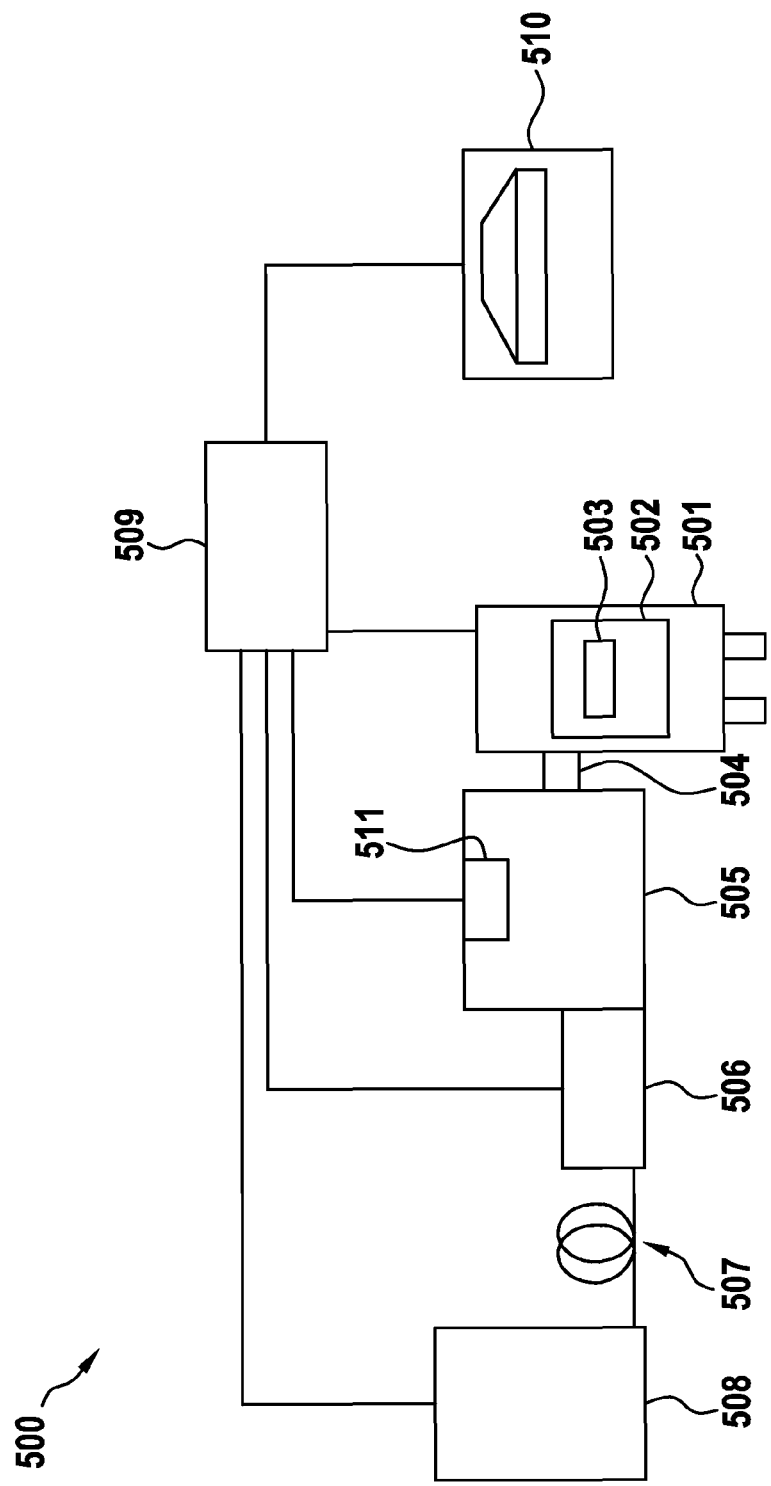
FIG. 7 shows an overview of the typical elements of a confocal microscope with an arrangement consisting of a photomultiplier and a computing unit according to a preferred embodiment of the invention in a schematic view.

FIG. 7 schematically shows a confocal microscope having typical components. 500 denotes the overall system. The confocal scanning and detection unit is denoted by 505. The associated illumination device is denoted by 506. 508 is a laser light source, which is connected via an illumination fiber 507 to the illumination device 506. 504 denotes an optical adapter for the confocal scanning and detection unit 505 on the microscope stand 501. The object stage 502 with a sample 503 that is to be examined is located within the stand 501. A computing unit of an arrangement according to the invention in the form of a control unit 509 is connected to the individual components 508, 506, 505 and 501 via corresponding connection lines. A computer with control and representation programs is denoted by 510; it, too, is connected to the control unit 509.

The sample 503 that is to be examined is illuminated via a microscope optical unit and is imaged by the same microscope optical unit in particular onto a sensor arrangement 511 of an arrangement according to the invention, which, depending on the embodiment of the confocal scanning and detection unit 505, consists of a photomultiplier or an array of photomultipliers.

In a first variant, a conventional confocal beam path is arranged within the confocal scanning and detection unit 505, which confocal beam path is set up in a known manner with an individual pinhole and a beam scanner, for example a mirror scanner.

In a second variant, a beam path in which the sample is illuminated simultaneously with one or more illumination points or with illumination points which are extensive in one direction is located within the confocal scanning and detection unit 505. Accordingly, the photons to be detected are selected for example with a geometric arrangement of pinholes. The sensor arrangement 511 then consists of an array of photomultipliers.

In the second variant of the overall system, which comprises a microscope with a sensor array, the individual photomultipliers, in particular SiPMs, which are evaluated according to a preferred embodiment of the invention, are arranged either linearly or as a two-dimensional photomultiplier matrix.

The first variant of the overall system has a conventional confocal beam path (as described above) within the confocal scanning and detection unit 505. In this case, the imaged beam is imaged onto an individual photomultiplier, in particular an SiPM, which is evaluated according to a preferred embodiment of the invention.

The function of a system 500 illustrated in FIG. 7 is sufficiently known per se and will therefore not be explained in this case.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

500 overall system
501 microscope stand with microscope optical unit
502 object stage
503 sample
504 optical adapter
505 confocal scanning and detection unit
506 illumination device
507 illumination fiber
508 laser light source
509 control unit
510 computer with control and representation programs
511 sensor arrangement with photomultiplier

The invention claimed is:

1. A method for counting photons using a semiconductor-photomultiplier, the method comprising:
   obtaining a measurement signal from a raw signal produced by the photomultiplier by correcting the raw signal for a noise signal and/or an offset, wherein an incident photon produces a pulse in the raw signal,
   integrating the measurement signal over time to form an analog integrated measurement signal, and
   ascertaining a number of photons that are incident in the photomultiplier by comparing a value of the analog integrated measurement signal to an integral proportionality value which corresponds to a specific number of photons incident in the photomultiplier.

2. The method as claimed in claim 1, wherein the noise signal and/or the offset is obtained from a raw signal produced by the photomultiplier in darkness.

3. The method as claimed in claim 1, wherein the integral proportionality value which corresponds to the specific number of photons incident in the photomultiplier is determined by integrating a calibration signal, which is obtained from a raw signal produced by the photomultiplier, over time to form an integrated calibration signal, and wherein a number of photons that were incident in the photomultiplier during the integration time is determined.

4. The method as claimed in claim 3, wherein the number of the photons incident in the photomultiplier is determined by comparing the calibration signal to a predetermined photon detection threshold value.

5. The method as claimed in claim 3, further comprising determining a normalized integral proportionality value that corresponds to a single photon incident in the photomultiplier.

6. The method as claimed in claim 3, wherein the calibration signal is obtained from a raw signal produced by the photomultiplier at a low photon rate and/or in darkness.

7. The method as claimed in claim 1, wherein the number of the photons is determined by incrementing a counting value of the number of the photons each time the value of the analog integrated measurement signal has increased by the integral proportionality value.

8. The method as claimed in claim 1, wherein the integral proportionality value is subtracted from the analog integrated measurement signal each time the value of the analog integrated measurement signal reaches the integral proportionality value or exceeds it.

9. The method as claimed in claim 8, wherein the number of the photons is determined by incrementing a counting value of the number of the photons each time the integral proportionality value is subtracted from the analog integrated measurement signal.

10. The method as claimed in claim 1, wherein the photomultiplier is a semiconductor or silicon photomultiplier.

11. The method as claimed in claim 1, wherein the method is performed in a microscope system, confocal microscope system, or scanning confocal microscope system.

12. An arrangement comprising a photomultiplier and a computing unit and being configured to perform the method as claimed in claim 1.

13. A microscope system, confocal microscope system, or scanning confocal microscope system having the arrangement as claimed in claim 12.

14. A non-transitory machine-readable storage medium having a computer program comprising commands that cause an arrangement comprising a photomultiplier and a computing unit to perform the method as claimed in claim 1.

* * * * *